United States Patent
Kitagawa et al.

(10) Patent No.: US 9,529,131 B2
(45) Date of Patent: Dec. 27, 2016

(54) POLARIZING PLATE

(71) Applicant: NITTO DENKO CORPORATION, Ibaraki-shi, Osaka (JP)

(72) Inventors: Takeharu Kitagawa, Ibaraki (JP); Takashi Kamijo, Ibaraki (JP); Takeshi Saitou, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/816,718

(22) Filed: Aug. 3, 2015

(65) Prior Publication Data
US 2016/0033700 A1 Feb. 4, 2016

(30) Foreign Application Priority Data

Aug. 4, 2014 (JP) ................................. 2014-158697

(51) Int. Cl.
*G02B 5/30* (2006.01)
*G02B 1/14* (2015.01)
*G02B 1/08* (2006.01)

(52) U.S. Cl.
CPC .............. *G02B 5/3033* (2013.01); *G02B 1/08* (2013.01); *G02B 1/14* (2015.01)

(58) Field of Classification Search
CPC ........... G02B 5/30; G02B 5/3033; G02B 1/14; G02B 1/08
See application file for complete search history.

(56) References Cited

U.S. PATENT DOCUMENTS

| | | | |
|---|---|---|---|
| 2009/0153782 A1* | 6/2009 | Fukagawa | G02B 5/3083 349/96 |
| 2012/0038859 A1 | 2/2012 | Miyatake et al. | |
| 2012/0052197 A1 | 3/2012 | Sawada et al. | |
| 2014/0016198 A1 | 1/2014 | Sawada et al. | |
| 2014/0044947 A1 | 2/2014 | Sawada et al. | |
| 2015/0316696 A1 | 11/2015 | Kamijo et al. | |
| 2016/0033699 A1* | 2/2016 | Kitagawa | G02B 1/08 359/487.02 |

FOREIGN PATENT DOCUMENTS

| | | | | |
|---|---|---|---|---|
| JP | 2000-338329 A | 12/2000 | | |
| JP | WO 2009154050 A1 * | 12/2009 | ........... | G02B 5/3025 |
| JP | 2010-26498 A | 2/2010 | | |
| JP | 2010-271703 A | 12/2010 | | |

(Continued)

OTHER PUBLICATIONS

Office Action dated Oct. 14, 2015, issued in counterpart Japanese Application No. 2015-153814, with English translation. (12 pages).

(Continued)

*Primary Examiner* — Frank Font
(74) *Attorney, Agent, or Firm* — Westerman, Hattori, Daniels & Adrian, LLP

(57) ABSTRACT

A polarizing plate according to an embodiment of the present invention includes a polarizing film having a thickness of 10 μm or less and a protective layer provided on at least one side of the polarizing film through intermediation of an adhesion layer. The adhesion layer has a thickness of 0.7 μm or more, and the adhesion layer has a percentage of bulk water absorption of 10 wt % or less.

5 Claims, 6 Drawing Sheets

(56) References Cited

FOREIGN PATENT DOCUMENTS

| | | | | | |
|---|---|---|---|---|---|
| JP | 2011-2816 | A | | 1/2011 | |
| JP | 2013097170 | A | * | 5/2013 | ............... G02B 5/30 |
| JP | 2013-112693 | A | | 6/2013 | |
| JP | 2013-112715 | A | | 6/2013 | |
| JP | 2013-213186 | A | | 10/2013 | |
| JP | 2014-48496 | A | | 3/2014 | |
| KR | 1020120022608 | A | * | 3/2012 | ............... G02B 5/30 |
| TW | 201217149 | A | | 5/2012 | |
| TW | 201319184 | A | | 5/2013 | |
| TW | 201415095 | A | | 4/2014 | |
| TW | 201434638 | A | | 9/2014 | |
| TW | 201514269 | A | | 4/2015 | |
| WO | 2014/123184 | A1 | | 8/2014 | |
| WO | 2015/030203 | A1 | | 3/2015 | |

OTHER PUBLICATIONS

Explanation of Circumstances Concerning Accelerated Examination dated Dec. 25, 2014, filed in counterpart Japanese patent application No. 2014-158697 (5 pages).
Notification of Reason for Refusal dated Feb. 12, 2015, issued in counterpart Japanese patent application No. 2014-158697 (6 pages).
International Search Report dated Sep. 15, 2015, issued in counterpart International Patent Application No. PCT/JP2015/072021, (3 pages).
Office Action dated Jun. 14, 2016, issued in counterpart Taiwanese Patent Application No. 104125089, with English translation. (8 pages).

* cited by examiner

POLARIZING PLATE

This application claims priority under 35 U.S.C. Section 119 to Japanese Patent Application No. 2014-158697 filed on Aug. 4, 2014, which are herein incorporated by references.

BACKGROUND OF THE INVENTION

1. Field of the Invention

The present invention relates to a polarizing plate.

2. Description of the Related Art

A polarizing plate is used in an image display apparatus (such as a liquid crystal display apparatus). The polarizing plate generally includes a polarizing film and a protective layer for protecting the polarizing film. In recent years, it has been demanded that the image display apparatus be thinned, and in this connection, it has been demanded the polarizing plate be thinned.

Incidentally, there is a proposal of a method involving forming a polyvinyl alcohol-based resin layer on a resin substrate, and stretching and dyeing the resultant laminate to provide a polarizing film (for example, Japanese Patent Application Laid-open No. 2000-338329). According to such method, a polarizing film having a small thickness (for example, 10 μm or less) is obtained, and hence the method has been attracting attention for its capability to contribute to the thinning of the image display apparatus. However, when the thickness of the polarizing film is reduced, the polarizing plate to be obtained has a problem in that its external appearance is poor.

SUMMARY OF THE INVENTION

The present invention has been made in order to solve the conventional problems, and a primary object of the present invention is to provide a polarizing plate excellent in external appearance.

According to one aspect of the present invention, a polarizing plate is provided. The polarizing plate includes a polarizing film having a thickness of 10 μm or less and a protective layer provided on at least one side of the polarizing film through intermediation of an adhesion layer. The adhesion layer has a thickness of 0.7 μm or more, and the adhesion layer has a percentage of bulk water absorption of 10 wt % or less.

In one embodiment of the present invention, the polarizing film has a value for Aa×(Is/Ia) of 0.53 or more. The Aa represents an absorbance of the polarizing film in an absorption axis direction thereof at a wavelength of 480 nm. The Ia represents a value obtained by integrating an integrated intensity distribution of an integrated intensity in a thickness direction of the polarizing film in an entire interval in the thickness direction of the polarizing film, the integrated intensity being obtained by integrating a Raman spectrum of the polarizing film in a wavenumber interval from 90 $cm^{-1}$ to 120 $cm^{-1}$. The Is represents a value obtained by integrating an integrated intensity distribution of an integrated intensity in the thickness direction of the polarizing film in the entire interval in the thickness direction of the polarizing film, the integrated intensity being obtained by integrating Raman scattering of $I_3^-$ that is present, in a portion ranging from a polarizing film surface to a depth of 1 μm in the thickness direction of the polarizing film, and that is aligned in the absorption axis direction of the polarizing film in the wavenumber interval from 90 $cm^{-1}$ to 120 $cm^{-1}$.

In another embodiment of the present invention, the thickness of the adhesion layer is 2 μm or less.

In still another embodiment of the present invention, the percentage of bulk water absorption of the adhesion layer is 0.05 wt % or more.

In still another embodiment of the present invention, the adhesion layer is formed by curing a curable adhesive.

In still another embodiment of the present invention, the adhesion layer has a storage modulus in a region of 70° C. or less of from $1.0 \times 10^6$ Pa to $1.0 \times 10^{10}$ Pa.

According to another aspect of the present invention, an image display apparatus is provided. The image display apparatus includes the polarizing plate.

According to one embodiment of the present invention, the protective layer is provided on the polarizing film through the intermediation of the adhesion layer having a thickness of 0.7 μm or more, and thus the generation of air bubbles can be effectively suppressed. As a result, a polarizing plate excellent in external appearance can be obtained. In addition, the percentage of bulk water absorption of the adhesion layer is set to 10 wt % or less, and thus a polarizing plate that also has durability can be obtained.

DETAILED DESCRIPTION OF THE PREFERRED EMBODIMENTS

Embodiments of the present invention are described below. However, the present invention is not limited to these embodiments.

Figure 1:
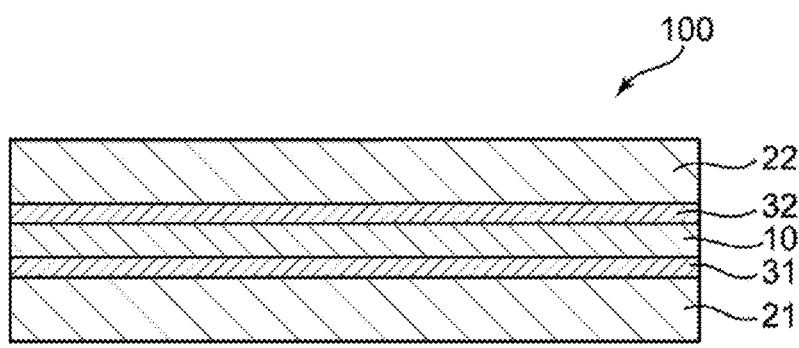
FIG. 1 is a schematic cross-sectional view of a polarizing plate according to one embodiment of the present invention.

FIG. 1 is a schematic cross-sectional view of a polarizing plate according to one embodiment of the present invention. A polarizing plate 100 includes a polarizing film 10, a first protective layer 21 provided on one side of the polarizing film 10, and a second protective layer 22 provided on the other side of the polarizing film 10. The first protective layer 21 is provided on the polarizing film 10 through the intermediation of a first adhesion layer 31. The second protective layer 22 is provided on the polarizing film 10 through the intermediation of a second adhesion layer 32. When the protective layers are respectively provided on both sides of the polarizing film as in the illustrated example, the protective layers may have the same construction, or may have different constructions.

A. Polarizing Film

The polarizing film is typically a polyvinyl alcohol-based resin (hereinafter referred to as "PVA-based resin") membrane having a dichromatic substance adsorbed and aligned thereon. The polarizing film has a thickness of preferably 10 µm or less, more preferably 7 µm or less, particularly preferably 5 µm or less. On the other hand, the thickness of the polarizing film is preferably 0.5 µm or more, more preferably 1.0 µm or more.

The polarizing film preferably exhibits absorption dichroism at any wavelength in the wavelength range of from 380 nm to 780 nm. The polarizing film has a single axis transmittance of preferably 40.0% or more, more preferably 41.0% or more, still more preferably 42.0% or more, particularly preferably 43.0% or more. The polarizing film has a polarization degree of preferably 99.8% or more, more preferably 99.9% or more, still more preferably 99.95% or more.

Examples of the dichromatic substance include iodine and an organic dye. The substances may be used alone or in combination. Iodine is preferred as the dichromatic substance.

Any appropriate resin may be adopted as a PVA-based resin for forming the PVA-based resin membrane. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizing film excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 4,500, more preferably from 1,500 to 4,300. It should be noted that the average polymerization degree may be determined in conformity with JIS K 6726-1994.

In one embodiment, the polarizing film has a value for Aa×(Is/Ia) of 0.53 or more, where: Aa represents the absorbance of the polarizing film in the absorption axis direction thereof at a wavelength of 480 nm; Ia represents a value obtained by integrating the integrated intensity distribution of an integrated intensity in the thickness direction of the polarizing film in the entire interval in the thickness direction of the polarizing film, the integrated intensity being obtained by integrating a Raman spectrum of the polarizing film in a wavenumber interval from 90 cm$^{-1}$ to 120 cm$^{-1}$; and Is represents a value obtained by integrating the integrated intensity distribution of an integrated intensity in the thickness direction of the polarizing film in the entire interval in the thickness direction of the polarizing film, the integrated intensity being obtained by integrating Raman scattering of $I_3^-$ that is present in a portion ranging from a polarizing film surface to a depth of 1 µm in the thickness direction of the polarizing film, and that is aligned in the absorption axis direction of the polarizing film in the wavenumber interval from 90 cm$^{-1}$ to 120 cm$^{-1}$. Further, the value for Aa×(Is/Ia) may be set to 0.55 or more.

As described later in detail, the Aa×(Is/Ia) is an indicator for the iodine concentration of the polarizing film surface. A polarizing film having a small thickness (a thickness of 10 µm or less) has a high iodine concentration, and may show the above-mentioned value for Aa×(Is/Ia). It should be noted that the iodine amount of the polarizing film to be obtained may not be uniform in its thickness direction depending on its production method. For example, a polarizing film in which iodine is uniformly present in its thickness direction can be obtained by adopting an underwater stretching mode to be described later.

Figure 2:
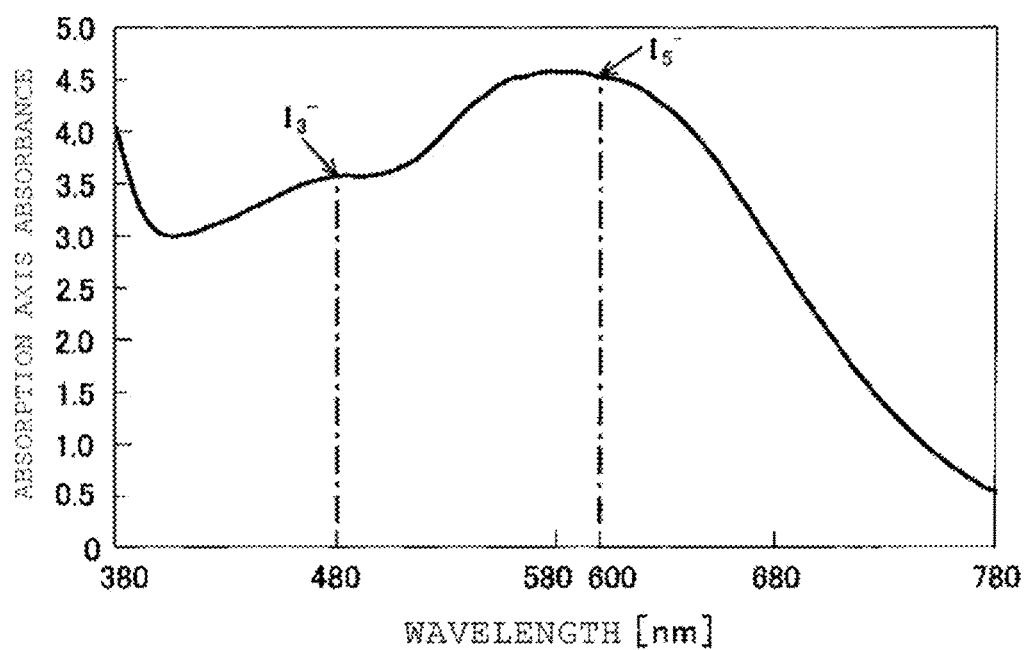
FIG. 2 is a graph showing a relationship between absorbance and wavelength in the case where polarized light parallel to the absorption axis of a polarizing film is allowed to enter.

The meaning of the absorbance Aa of the polarizing film in the absorption axis direction thereof at the wavelength of 480 nm is described. FIG. 2 shows a graph showing a relationship between absorbance and wavelength in the case where polarized light parallel to the absorption axis of the polarizing film is allowed to enter. In the polarizing film that is a PVA-based resin membrane having iodine adsorbed thereon, the adsorbed iodine is said to take the form of a complex of a poly iodide ion such as $I_3^-$ or $I_5^-$ with PVA. In FIG. 2, it is known that, absorption around 480 nm corresponds to $I_3^-$ in the form of a complex with PVA, and absorption around 600 nm corresponds to $I_5^-$ in the form of a complex with PVA.

According to the Lambert-Beer law, the absorbance A of a certain medium may be generally represented by A=εcL where ε represents the molar absorption coefficient of the medium, c represents the molar concentration of the medium, and L represents a cell (optical path) length. This gives cL=A/ε, and hence the absorbance serves as an indicator for the amount of the medium per unit area in the entire film thickness of the polarizing film (area density of the medium). Therefore, although the molar absorption coefficient of each of $I_3^-$ and $I_5^-$ in the form of a complex with PVA is difficult to determine, the amount of $I_3^-$ in the form of a complex with PVA that, is aligned in the absorption axis direction of the polarizing film per unit area in the entire film thickness of the polarizing film may be represented by using the absorbance Aa of the polarizing film in the absorption axis direction thereof at 480 nm as an indicator.

The absorbance Aa of the polarizing film in the absorption axis direction thereof at 480 nm is an indicator for the amount of in the form of a complex with PVA that is aligned in the absorption axis direction of the polarizing film per unit area in the entire film thickness of the polarizing film. Accordingly, an indicator for the amount of $I_3^-$ in the form of a complex with PVA that is aligned in the absorption axis direction of the polarizing film in a portion in the vicinity of the polarizing film surface can be determined when its ratio with respect to the entire thickness direction is found. Herein, it is assumed that the amount of $I_3^-$ in the form of a complex with PVA that is aligned in the absorption axis direction of the polarizing film in the portion in the vicinity of the polarizing film surface is the amount of $I_3^-$ in the form of a complex with PVA that is present in a portion ranging from the polarizing film surface to a depth of 1 µm in the thickness direction of the polarizing film, and that is aligned in the absorption axis direction of the polarizing film.

Figure 3:
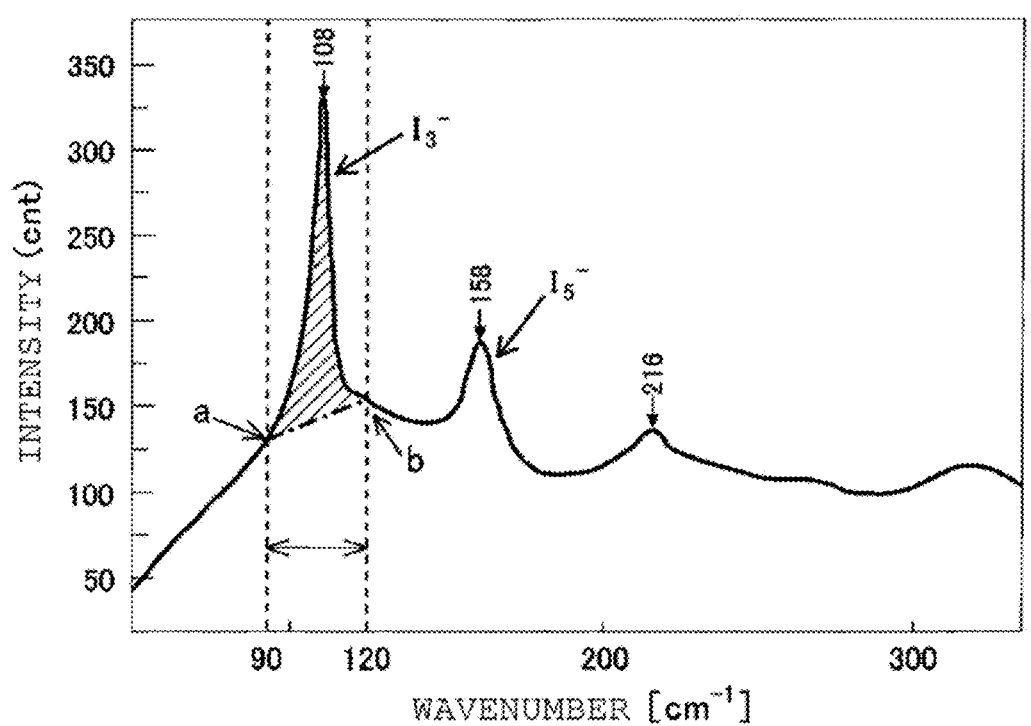
FIG. 3 is one example of a Raman spectrum of a polarizing film.

Raman spectroscopy is known as means for evaluating the amount of $I_3^-$ or $I_5^-$ in a polarizing film. The Raman spectroscopy is a method involving allowing laser light having a single wavelength in an ultraviolet to near-infrared region to enter, and detecting Raman scattered light that results from the vibration of a molecular skeleton. FIG. 3 shows an example of a Raman spectrum of a polarizing film obtained by Raman spectroscopy using laser light having a polarization plane parallel to the absorption axis direction of the polarizing film and having a wavelength of 514.5 nm. In this Raman spectrum, it is known that a peak around 108 cm$^{-1}$ is attributable to $I_3^-$ that is aligned in the absorption axis direction of the polarizing film, and a peak around 158 cm$^{-1}$ is attributable to $I_5^-$ that is aligned in the absorption axis direction of the polarizing film. Thus, the integrated intensity obtained by integration in a predetermined wavenumber interval in the vicinity of the peak around a wavenumber of 103 cm$^{-1}$ in the Raman spectrum may be used as an indicator for the amount of $I_3^-$ that is aligned in the absorption axis direction of the polarizing film at a measurement point.

A wavenumber interval from 90 cm$^{-1}$ to 120 cm$^{-1}$ is adopted as the predetermined wavenumber interval. In addition, baseline correction is performed for Raman intensity. Referring now to FIG. 3, the baseline correction refers to the following operation: in the wavenumber interval from 90 cm$^{-1}$ to 120 cm$^{-1}$, a straight, line connecting the respective points a and b of a Raman intensity at a wavenumber of 90 cm$^{-1}$ and a Raman intensity at a wavenumber of 120 cm$^{-1}$ is used to approximate the baseline of the Raman spectrum as a straight line, and a distance from the approximation straight, line is defined as a Raman intensity to correct the slope of the baseline at the time of measurement.

Figure 4:
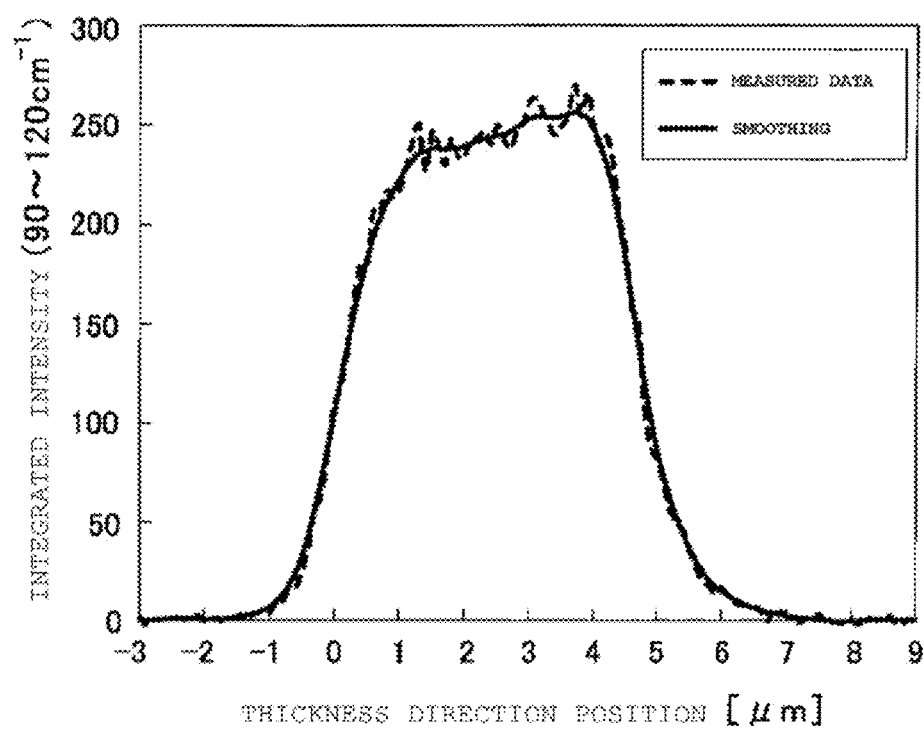
FIG. 4 is an example of the distribution of integrated intensities in a wavenumber interval from 90 $cm^{-1}$ to 120 $cm^{-1}$ in Raman spectra at respective measurement points of a polarizing film based on Raman spectroscopy.

In order to determine the ratio of the amount of $I_3^-$ that is present in the portion ranging from the polarizing film surface to a depth of 1 μm in the thickness direction of the polarizing film, and that is aligned in the absorption axis direction of the polarizing film to the amount in the entire thickness direction of the polarizing film, first, a Raman spectrum is measured for a cross-section of the polarizing film while moving a measurement point in the thickness direction, to thereby determine the distribution of integrated intensities in the wavenumber interval from 90 cm$^{-1}$ to 120 cm$^{-1}$ at respective measurement points. FIG. 4 shows an example of the resultant integrated intensity distribution (polarizing film of Example 2 to be described later). It should be noted that the origin of the thickness direction in the figure corresponds to the position of an inflection point to be described later, and it is assumed that light, is allowed to enter from a negative coordinate side. In FIG. 4, i.e., the graph of the integrated intensity distribution in the thickness direction of the polarizing film, the value Ia obtained by integrating the integrated intensity distribution in the entire interval in the thickness direction of the polarizing film corresponds to the Raman scattering of $I_3^-$ that is present, in the entire thickness direction of the polarizing film, and that is aligned in the absorption axis direction of the polarizing film, and hence is considered to indicate the amount of $I_3^-$ that is aligned in the absorption axis direction of the polarizing film in the entire thickness direction of the polarizing film.

Ia is determined as the integral of the integrated intensity that has been subjected to smoothing processing with a weighted moving average. In the smoothing processing, an integrated intensity at a position x in the thickness direction before the smoothing processing is represented by I(x), and an integrated intensity $I_{WMA}(x)$ after the smoothing processing is determined by the following equation.

$$I_{WMA}(x)=[I(x-0.5)\times1+I(x-0.4)\times2+I(x-0.3)\times4+I(x-0.2)\times6+I(x-0.1)\times8+I(x)\times10+I(x+0.1)\times8+I(x+0.2)\times6+I(x+0.3)\times4+I(x+0.4)\times2+I(x+0.5)\times1]/(1+2+4+6+8+10+8+6+4+2+1)$$

FIG. 4 shows an example of the resultant integrated intensity distribution after the smoothing processing.

In addition, the amount of $I_3^-$ that is present in the portion ranging from the polarizing film surface to a depth of 1 μm in the thickness direction of the polarizing film, and that is aligned in the absorption axis direction of the polarizing film corresponds to the Raman scattering of $I_3^-$ that is present in the portion ranging from the polarizing film surface to a depth of 1 μm in the thickness direction of the polarizing film, and that is aligned in the absorption axis direction of the polarizing film. Therefore, the value Is obtained by integrating the integrated intensity distribution of an integrated intensity in the thickness direction of the polarizing film in the thickness direction of the polarizing film, the integrated intensity being obtained by integrating the Raman scattering of $I_3^-$ that, is present in the portion ranging from the polarizing film surface to a depth of 1 μm in the thickness direction of the polarizing film, and that, is aligned in the absorption axis direction of the polarizing film in the wavenumber interval from 90 cm$^{-1}$ to 120 cm$^{-1}$, is considered to indicate the amount of $I_3^-$ that, is present, in the portion ranging from the polarizing film surface to a depth of 1 μm in the thickness direction of the polarizing film, and that is aligned in the absorption axis direction of the polarizing film.

Therefore, because it is considered that the ratio of the amount of $I_3^-$ in the form of a complex with PVA that is present in the portion ranging from the polarizing film surface to a depth of 1 μm in the thickness direction of the polarizing film, and that is aligned in the absorption axis direction of the polarizing film to the amount of $I_3^-$ in the form of a complex with PVA that is aligned in the absorption axis direction of the polarizing film in the entire thickness direction of the polarizing film may be approximated by the ratio of the amount of $I_3^-$ that is present in the portion ranging from the polarizing film surface to a depth of 1 μm in the thickness direction of the polarizing film, and that is aligned in the absorption axis direction of the polarizing film to the amount of $I_3^-$ that is aligned in the absorption axis direction of the polarizing film in the entire thickness direction of the polarizing film, the Aa×(Is/Ia) serves as an indicator for the amount of $I_3^-$ in the form of a complex with PVA that is present in the portion ranging from the polarizing film surface to a depth of 1 μm in the thickness direction of the polarizing film, and that is aligned in the absorption axis direction of the polarizing film.

In this context, the amount of $I_3^-$ that, is present in the portion ranging from the polarizing film surface to a depth of 1 μm in the thickness direction of the polarizing film, and that is aligned in the absorption axis direction of the polarizing film corresponds to the value Is obtained by integrating the distribution curve (partial distribution curve) of the integrated intensity in the entire interval in the thickness direction of the polarizing film, the integrated intensity corresponding to the Raman scattering of $I_3^-$ that is present in the portion ranging from the polarizing film surface to a depth of 1 μm in the thickness direction of the polarizing film, and that is aligned in the absorption axis direction of the polarizing film, but the value Is cannot be accurately determined. Accordingly, the value Is obtained by integrating the integrated intensity distribution of the integrated intensity in the thickness direction of the polarizing film in the entire interval in the thickness direction of the polarizing film, the integrated intensity being obtained by integrating the Raman scattering of $I_3^-$ that is present in the portion ranging from the polarizing film surface to a depth of 1 μm in the thickness direction of the polarizing film, and that is aligned in the absorption axis direction of the polarizing film in the wavenumber interval from 90 cm$^{-1}$ to 120 cm$^{-1}$, is approximately determined.

Figure 5:
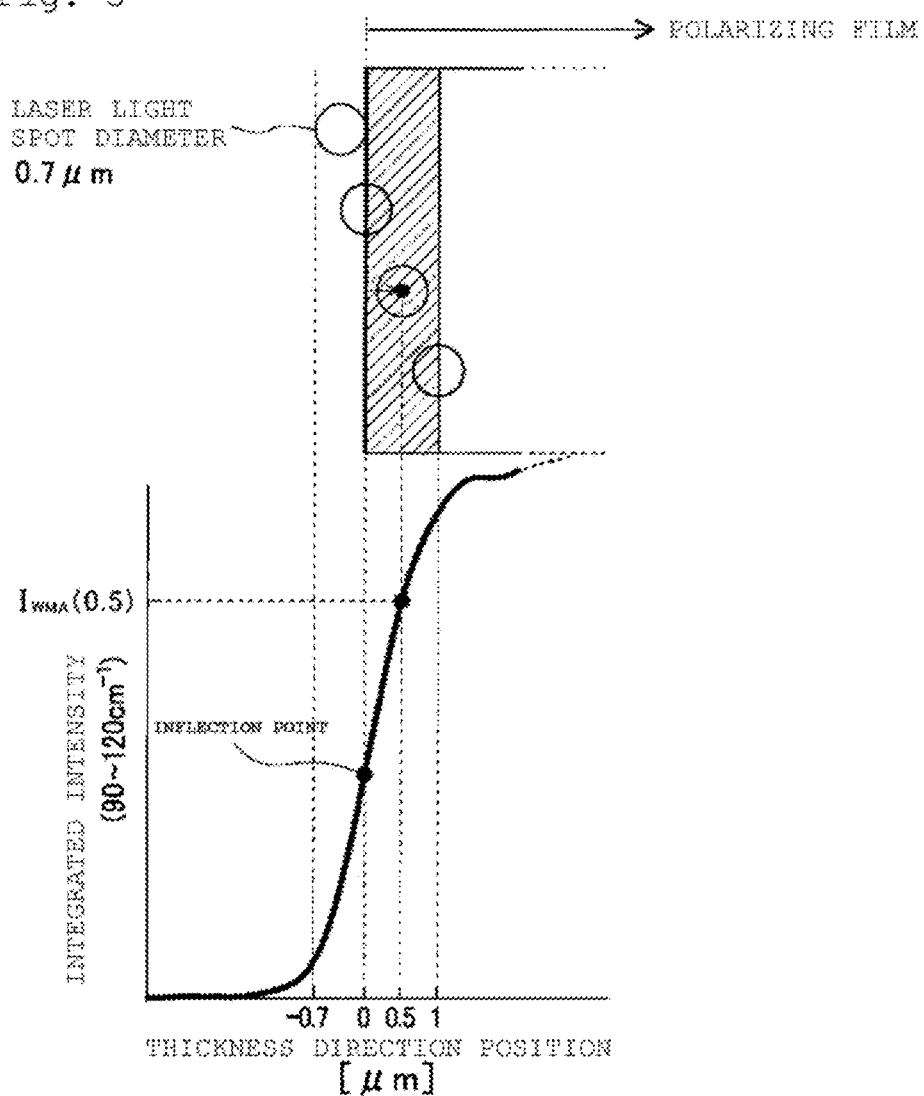
FIG. 5 is a graph showing a relationship between the integrated intensity distribution of $I_3^-$ after smoothing processing and the position of a laser light spot in the approximation of Is.

Referring to FIG. 5, first, in the integrated intensity distribution after the smoothing processing obtained as described above in the calculation of Ia, an inflection point at a rise on the side on which light enters is determined. Assuming that the spot cross-section of laser light to be used in the Raman analysis is circular, when the center of the spot cross-section is located at a position on the polarizing film surface, it is considered that the rate of change in area of the cross-section of the polarizing film irradiated with the laser light becomes a local maximum and the rate of change in integrated intensity of the Raman scattering of $I_3^-$ becomes a local maximum. Accordingly, the position of the inflection point may be presumed to be substantially a position on the polarizing film surface.

Next, when the spot cross-section of the laser light is located at the center of the portion ranging from the polarizing film surface to a depth of 1 μm in the thickness direction of the polarizing film, i.e., a position of 0.5 μm from the polarizing film surface, the ratio of Raman scattering from $I_3^-$ that is present in a portion other than the portion ranging from the polarizing film surface to a depth of 1 μm in the thickness direction of the polarizing film or from air to a measured value is smallest as compared to that in the case where the spot cross-section of the laser light is located at any other position. Thus, the integrated intensity in the case where the spot cross-section of the laser light, is located at a position of +0.5 μm from the polarizing film surface is considered to best, indicate the value for the integrated intensity corresponding to the Raman scattering of $I_3^-$ that is present in the portion ranging from the polarizing film surface to a depth of 1 μm in the thickness direction of the polarizing film. Accordingly, Is is determined by the following approximation: the integrated intensity distribution of the integrated intensity in the thickness direction of the polarizing film, the integrated intensity being obtained by integrating the Raman scattering of $I_3^-$ that is present in the portion ranging from the polarizing film surface to a depth of 1 μm in the thickness direction of the polarizing film, and that is aligned in the absorption axis direction of the polarizing film in the wavenumber interval from 90 cm$^{-1}$ to 120 cm$^{-1}$, is regarded as constant at a value $I_{WMA}(0.5)$ for the integrated intensity after the smoothing processing at the position of 0.5 μm from the inflection point in the interval from the polarizing film surface to 1 μm, and is regarded as zero in any other interval. That is, approximation is performed by $Is=I_{WMA}(0.5) \times 1=I_{WMA}(0.5)$.

Any appropriate method may be adopted as a manufacturing method for the polarizing film. The polarizing film is typically manufactured by subjecting a PVA-based resin membrane to various treatments. Any appropriate form may be adopted for the PVA-based resin membrane to be subjected to various treatments. Specifically, a PVA-based resin film may be adopted, or a PVA-based resin layer formed on a resin substrate may be adopted.

In one embodiment, the polarizing film is manufactured by forming a PVA-based resin layer on a resin substrate to produce a laminate, and subjecting the laminate to various treatments. The PVA-based resin layer is formed by, for example, applying an application liquid containing a PVA-based resin onto the resin substrate. A solution prepared by dissolving the PVA-based resin in a solvent is typically used as the application liquid. Examples of the solvent to be used for dissolving the PVA-based resin include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. The solvents may be used alone or in combination. Of those, water is preferred. The concentration of the PVA-based resin in the solution is preferably from 3 parts by weight to 20 parts by weight with respect to 100 parts by weight of the solvent.

The application liquid may contain an additive. Examples of the additive include a plasticizer and a surfactant. Examples of the plasticizer include polyhydric alcohols such as ethylene glycol and glycerin. An example of the surfactant is a nonionic surfactant. Such additive may be used for the purpose of additionally improving the uniformity, dyeing property, or stretchability of the PVA-based resin layer to be obtained. Another example of the additive is an easy-adhesion component. The use of the easy-adhesion component can improve adhesiveness between the resin substrate and the PVA-based resin layer. As a result, for example, a problem such as the peeling of the PVA-based resin layer from the resin substrate is suppressed, and thus dyeing and underwater stretching to be described later can be satisfactorily performed. For example, modified PVA such as acetoacetyl-modified PVA is used as the easy-adhesion component.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application temperature of the application liquid is preferably 50° C. or more. A coat of the application liquid is preferably dried. The drying temperature is preferably 50° C. or more.

The thickness of the PVA-based resin layer (before stretching) is preferably from 3 μm to 40 μm, more preferably from 3 μm to 20 μm.

Any appropriate material may be adopted as a constituent material for the resin substrate. Examples of the material include an ester-based resin such as a polyethylene terephthalate-based resin, a cycloolefin-based resin, an olefin-based resin such as polypropylene, a (meth)acrylic resin, a polyamide-based resin, a polycarbonate-based resin, and a copolymer resin thereof. Of those, a polyethylene terephthalate-based resin is preferably used. In particular, an amorphous polyethylene terephthalate-based resin is preferably used. Specific examples of the amorphous polyethylene terephthalate-based resin include: a copolymer further containing isophthalic acid as a dicarboxylic acid; and a copolymer further containing cyclohexanedimethanol as a glycol.

The glass transition temperature (Tg) of the resin substrate is preferably 100° C. or less. When such resin substrate is used, in the stretching of a laminate to be described later, stretchability (particularly in underwater stretching) can be sufficiently secured while the crystallization of the PVA-based resin is suppressed. As a result, a polarizing film having excellent optical properties (for example, a polarization degree) can be manufactured. On the other hand, the glass transition temperature of the resin substrate is preferably 60° C. or more. It should be noted that the glass transition temperature (Tg) is a value determined in conformity with JIS K 7121.

The thickness of the resin substrate is preferably from 20 μm to 300 μm, more preferably from 50 μm to 200 μm. A surface of the resin substrate may be subjected to surface modification treatment (e.g., corona treatment), or may have an easy-adhesion layer formed thereon.

Examples of the various treatments include dyeing treatment, stretching treatment, insolubilizing treatment, cross-linking treatment, washing treatment, and drying treatment. The treatments may be appropriately selected depending on purposes. In addition, the order, timing, number of times, and the like of the treatments may be appropriately set. The respective treatments are described below.

(Dyeing Treatment)

The dyeing treatment is typically performed by dyeing the PVA-based resin membrane with a dichromatic substance. The dyeing treatment, is preferably performed by causing the PVA-based resin membrane to adsorb a dichromatic substance. A method for the adsorption is, for example, a method involving immersing the PVA-based resin membrane (laminate) in a dyeing liquid containing a dichromatic substance, a method involving applying the dyeing liquid onto the PVA-based resin membrane, or a method involving spraying the dyeing liquid on the PVA-based resin membrane. Of those, a method involving immersing the laminate in the dyeing liquid is preferred. This is because the dichromatic substance can satisfactorily adsorb to the membrane.

When iodine is used as the dichromatic substance, the dyeing liquid is preferably an aqueous solution of iodine. The compounding amount of iodine is preferably from 0.1 part by weight to 0.5 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably from 0.02 part by weight to 20 parts by weight, more preferably from 0.1 part by weight to 10 parts by weight with respect to 100 parts by weight of water.

The liquid temperature of the dyeing liquid at the time of the dyeing is preferably from 20° C. to 50° C. in order that the dissolution of the PVA-based resin may be suppressed. When the PVA-based resin membrane is immersed in the dyeing liquid, an immersion time is preferably from 5 seconds to 5 minutes in order that the transmittance of the PVA-based resin membrane may be secured. In addition, the dyeing conditions (the concentration, the liquid temperature, and the immersion time) may be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be from 40% to 44%.

(Stretching Treatment)

Any appropriate method may be adopted as a method of stretching the laminate. Specifically, fixed-end stretching (e.g., a method involving using a tenter stretching machine) may be adopted, or free-end stretching (e.g., a method involving passing the laminate between rolls having different peripheral speeds to uniaxially stretch the laminate) may be adopted. Alternatively, simultaneous biaxial stretching (e.g., a method involving using a simultaneous biaxial stretching machine) may be adopted, or sequential biaxial stretching may be adopted. The stretching of the laminate may be performed in one stage, or may be performed in a plurality of stages. When the stretching is performed in a plurality of stages, the stretching ratio (maximum stretching ratio) of the laminate to be described later is the product, of stretching ratios in the respective stages.

The stretching treatment may be an underwater stretching mode, in which stretching is performed while the laminate is immersed in a stretching bath, or may be an in-air stretching mode. It is preferred that underwater stretching treatment be performed at least once, and it is more preferred that underwater stretching treatment and in-air stretching treatment be performed in combination. According to the underwater stretching, the stretching can be performed at a temperature lower than the glass transition temperature (typically about 30° C.) of each of the resin substrate and the PVA-based resin membrane, and hence the PVA-based resin membrane can be stretched at a high ratio while its crystallization is suppressed. As a result, a polarizing film having excellent optical characteristics (e.g., polarization degree) can be manufactured.

Any appropriate direction may be selected as a direction in which the laminate is stretched. In one embodiment, the laminate having an elongate shape is stretched in its longitudinal direction. Specifically, the laminate is conveyed in its longitudinal direction, and is stretched in its conveying direction (MD). In another embodiment, the Laminate having an elongate shape is stretched in its width direction. Specifically, the laminate is conveyed in its longitudinal direction, and is stretched in a direction (TD) perpendicular to its conveying direction (MD).

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of a problem due to the crystallization (such as the inhibition of the orientation of the PVA-based resin membrane by the stretching).

When the underwater stretching mode is adopted as a stretching mode, the liquid temperature of a stretching bath is preferably from 40° C. to 35° C., more preferably from 50° C. to 85° C. At such temperature, the PVA-based resin membrane can be stretched at a high ratio while its dissolution is suppressed. Specifically, as described above, the glass transition temperature (Tg) of the resin substrate is preferably 60° C. or more in relation to the formation of the PVA-based resin membrane. In this case, when the stretching temperature falls short of 40° C., there is a risk that the stretching cannot be satisfactorily performed even in consideration of the plasticization of the resin substrate by water. On the other hand, as the temperature of the stretching bath increases, the solubility of the PVA-based resin membrane is raised and hence excellent optical characteristics may not be obtained.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin membrane, rigidity enough to withstand a tension to be applied at the time of the stretching and such water resistance that the membrane does not dissolve in water. Specifically, boric acid can produce a tetrahydroxyborate anion in the aqueous solution to cross-link with the PVA-based resin through a hydrogen bond. As a result, the PVA-based resin membrane can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably from 1 part by weight to 10 parts by weight with respect to 100 parts by weight of water. Setting the concentration of boric acid to 1 part by weight or more can effectively suppress the dissolution of the PVA-based resin membrane, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

The stretching bath (aqueous solution of boric acid) is preferably compounded with an iodide. Compounding the bath with the iodide can suppress the elution of iodine that the PVA-based resin membrane has been caused to adsorb. Specific examples of the iodide are as described above. The concentration of the iodide is preferably from 0.05 part by weight to 15 parts by weight, more preferably from 0.5 part by weight to 8 parts by weight with respect to 100 parts by weight of water.

The laminate is preferably immersed in the stretching bath for a time of from 15 seconds to 5 minutes.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

The underwater stretching treatment is preferably performed after the dyeing treatment.

(Insolubilizing Treatment)

The insolubilizing treatment is typically performed by immersing the PVA-based resin membrane in an aqueous solution of boric acid. Particularly when the underwater stretching mode is adopted, water resistance can be imparted to the PVA-based resin membrane by subjecting the membrane to the insolubilizing treatment. The concentration of the aqueous solution of boric acid is preferably from 1 part by weight to 4 parts by weight with respect to 100 parts by weight of water. The liquid temperature of an insolubilizing bath (the aqueous solution of boric acid) is preferably from 20° C. to 40° C. The insolubilizing treatment is preferably performed after the production of the Laminate and before the dyeing treatment or the underwater stretching treatment.

(Cross-Linking Treatment)

The cross-linking treatment is typically performed by immersing the PVA-based resin membrane in an aqueous solution of boric acid. Water resistance can be imparted to the PVA-based resin membrane by subjecting the membrane to the cross-linking treatment. The concentration of the aqueous solution of boric acid is preferably from 1 part by weight to 4 parts by weight with respect to 100 parts by weight of water. In addition, when the cross-linking treatment is performed after the dyeing treatment, the solution is preferably further compounded with an iodide. Compounding the solution with the iodide can suppress the elution of iodine that the PVA-based resin membrane has been caused to adsorb. The compounding amount of the iodide is preferably from 1 part by weight to 5 parts by weight with respect to 100 parts by weight of water. Specific examples of the iodide are as described above. The liquid temperature of a cross-linking bath (the aqueous solution of boric acid) is preferably from 20° C. to 50° C. The cross-linking treatment is preferably performed before the underwater stretching treatment. In a preferred embodiment, the dyeing treatment, the cross-linking treatment, and the underwater stretching treatment are performed in the stated order.

(Washing Treatment)

The washing treatment is typically performed by immersing the PVA-based resin membrane in an aqueous solution of potassium iodide.

(Drying Treatment)

The drying temperature in the drying treatment is preferably from 30° C. to 100° C.

B. Protective Layer

Any appropriate resin film may be used as the protective layer. As a formation material for the resin film, there are given, for example: a (meth)acrylic resin, a cellulose-based resin such as diacetylcellulose or triacetylcellulose; a cycloolefin-based resin such as a norbornene-based resin; an olefin-based resin such as polypropylene; an ester-based resin such as a polyethylene terephthalate-based resin; a polyamide-based resin; a polycarbonate-based resin; and a copolymer resin thereof. It should be noted that the term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, Japanese Patent Application Laid-open No. 2006-300033, Japanese Patent Application Laid-open No. 2006-317560, Japanese Patent Application Laid-open No. 2006-328329, Japanese Patent Application Laid-open No. 2006-328334, Japanese Patent Application Laid-open No. 2006-337491, Japanese Patent Application Laid-open No. 2006-337492, Japanese Patent Application Laid-open No. 2006-337493, Japanese Patent Application Laid-open No. 2006-337569, Japanese Patent Application Laid-open No. 2007-009182, Japanese Patent Application Laid-open No. 2009-161744, and Japanese Patent Application Laid-open No. 2010-284840. The descriptions thereof are incorporated herein by reference.

The resin film is formed by any appropriate method. Examples of the film-forming method include a melt extrusion method, a solution casting method, a calender method, and a compression forming method. Of those, a melt extrusion method is preferred. In addition, the resin film may be subjected to stretching treatment.

The thickness of the protective layer is generally from 10 µm to 100 µm, preferably from 10 µm to 50 µm, more preferably from 10 µm to 30 µm.

C. Adhesion Layer

The adhesion layer may be formed of any appropriate adhesive and/or pressure-sensitive adhesive. The adhesion layer has a thickness of 0.7 µm or more, preferably 0.8 µm or more, more preferably 0.9 µm or more. When such adhesion layer is formed, the generation of air bubbles can be effectively suppressed, and thus a polarizing plate excellent in external appearance can be obtained. As described above, a polarizing film having a small thickness has a high iodine concentration, and the polarizing film tends to be hard when having a high iodine concentration. In the lamination of the protective layer on the polarizing film through the intermediation of the adhesion layer, when the polarizing film is hard, air bubbles are liable to be generated between the polarizing film and the adhesion layer. The provision of the adhesion layer having such thickness on the polarizing film having a small thickness (a thickness of 10 μm or less) is one feature of the present invention. On the other hand, the thickness of the adhesion layer is preferably 2 μm or less, more preferably 1.7 μm or less, particularly preferably 1.5 μm or less. When the thickness falls within such range, durability can be kept. Specifically, the degradation of optical characteristics under high humidity can be suppressed.

The adhesion layer has a percentage of bulk water absorption of 10 wt % or less, preferably 8 wt % or less, more preferably 5 wt % or less, particularly preferably 2 wt % or less. When the percentage of bulk water absorption is set to 10 wt % or less, a polarizing plate that also has excellent durability can be obtained. Specifically, when the polarizing plate is placed under a high-temperature and high-humidity environment, the penetration of water into the polarizing film is suppressed, and thus problems such as the generation of speckles and the degradation of optical characteristics can be suppressed. On the other hand, the percentage of bulk water absorption of the adhesion layer is preferably 0.05 wt % or more. When the percentage of bulk water absorption is set to 0.05 wt % or more, the adhesion layer can appropriately absorb moisture contained in the polarizing film when brought into contact with the polarizing film, and thus an external appearance failure (such as cissing or air bubbles) in the polarizing plate to be obtained can be suppressed. It should be noted that the percentage of bulk water absorption is measured in conformity with the testing method for a percentage of water absorption described in JIS K 7209. Specifically, the percentage of bulk water absorption is a percentage of water absorption in the case where an adhesion layer after curing is immersed in pure water at 23° C. for 24 hours, and is determined by the following equation: percentage of bulk water absorption (%)=[{(weight of adhesion layer after immersion)−(weight of adhesion layer before immersion)}/(weight of adhesion layer before immersion)]×100.

The adhesion layer has a glass transition temperature Tg of preferably 60° C. or more, more preferably 70° C. or more, still more preferably 75° C. or more, particularly preferably 100° C. or more, most preferably 120° C. or more. On the other hand, the glass transition temperature Tg of the adhesion layer is preferably 300° C. or less, more preferably 240° C. or less, particularly preferably 180° C. or less. When the glass transition temperature Tg falls within such range, a polarizing plate excellent in flexibility and excellent in durability can be obtained. The glass transition temperature is determined from the peak top temperature of tan δ obtained through dynamic viscoelasticity measurement. For example, the glass transition temperature may be measured using a dynamic viscoelasticity measuring apparatus available under the trade name "RSAIII" from TA Instruments under the following measurement conditions.
Sample size: 10 mm in width and 30 mm in length,
Clamp distance: 20 mm,
Measurement mode: tensile, Frequency: 1 Hz, Rate of temperature increase: 5° C./min The adhesion layer has a storage modulus in the region of 7G° C. or less of preferably from $1.0\times10^6$ Pa to $1.0\times10^{10}$ Pa, more preferably from $1.0\times10^7$ Pa to $1.0\times10^{13}$ Pa. When the storage modulus falls within such range, the generation of the air bubbles can be more effectively suppressed. In addition, a crack in the polarizing plate occurring upon application of a heat cycle (for example, from −40° C. to 80° C.) can be suppressed. The storage modulus may be measured by the dynamic viscoelasticity measurement.

The adhesion layer satisfying the above-mentioned percentage of bulk water absorption is formed by, for example, curing a curable adhesive. Examples of the curable adhesive include a radical polymerization-curable adhesive and a cationic polymerization-curable adhesive. The curable adhesive contains a curable compound as a main component. The percentage of bulk water absorption may be adjusted by appropriately selecting, for example, the kind and content of the curable compound.

(Radical Polymerization-Curable Adhesive)

The radical polymerization-curable adhesive contains a radically polymerizable compound as the curable compound. The radically polymerizable compound may be a compound capable of being cured with an active energy ray, or may be a compound capable of being cured with heat. Examples of the active energy ray include an electron beam, UV light, and visible light.

As the radically polymerizable compound, for example, there may be used a compound having a radically polymerizable functional group having a carbon-carbon double bond, such as a (meth)acryloyl group or a vinyl group. A polyfunctional radically polymerizable compound is preferably used as the radically polymerizable compound. The radically polymerizable compounds may be used alone or in combination. In addition, the polyfunctional radically polymerizable compound and a mono-functional radically polymerizable compound may be used in combination.

A compound having a high log P value (octanol/water partition coefficient) (preferably 2 or more, more preferably 3 or more, still more preferably 4 or more) is preferably used as the curable compound. In addition, a compound having a high log P value is preferably selected as the radically polymerizable compound as well. The log P value of the radically polymerizable compound is preferably 2 or more, more preferably 3 or more, still more preferably 4 or more. When the log P value falls within such range, the polarizing film can be prevented from being deteriorated by moisture, and thus a polarizing plate excellent in durability can be obtained. The log P value may be measured in conformity with the shake flask method described in JIS Z 7260. In addition, the log P value may also be determined through calculation using, for example, ChemDraw Ultra manufactured by CambridgeSoft.

Examples of the polyfunctional radically polymerizable compound include: esterified products of a (meth)acrylate and a polyhydric alcohol, such as tripropylene glycol di(meth)acrylate, tetraethylene glycol di(meth)acrylate, 1,6-hexanediol di(meth)acrylate, 1,9-nonanediol di(meth)acrylate, 1,10-decanediol diacrylate, 2-ethyl-2-butylpropanediol di(meth)acrylate, bisphenol A di(meth)acrylate, bisphenol A-ethylene oxide adduct di(meth)acrylate, bisphenol A-propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropane formal (meth)acrylate, dioxane glycol di(meth)acrylate, trimethyiolpropane tri(meth)acrylate, pentaerythritoltri(meth)acrylate, pentaerythritol tetra(meth)acrylate, dipentaerythritol penta(meth)acrylate, dipentaerythritol hexa(meth)acrylate, and EO-modified diglycerin tetra(meth)acrylate; 9,9-bis[4-(2-(meth)acryloyloxyethoxy)phenyl]fluorene; epoxy (meth)acrylate; urethane (meth)acrylate; and polyester (meth)acrylate.

A compound having a high log P value is preferably used as the polyfunctional radically polymerizable compound. Examples of such compound include: an alicyclic (meth)acrylate such as tricyclodecanedimethanol di(meth)acrylate (log P=3.05) or isobornyl (meth)acrylate (log P=3.27); a long-chain aliphatic (meth)acrylate such as 1,9-nonanediol di(meth)acrylate (log P=3.68) or 1,10-decanediol diacrylate (log P=4.10); a multibranched (meth)acrylate such as neopentyl glycol hydroxypivalate-(meth)acrylic acid adduct (log P=3.35) or 2-ethyl-2-butylpropanediol di(meth)acrylate (log P=3.92); and an aromatic ring-containing (meth)acrylate such as bisphenol A di(meth)acrylate (log P=5.46), bisphenol A-ethylene oxide (4 mole) adduct di(meth)acrylate (log P=5.15), bisphenol A-propylene oxide (2 mole) adduct di(meth)acrylate (log P=6.10), bisphenol A-propylene oxide (4 mole) adduct di(meth)acrylate (log P=6.43), 9,9-bis[4-(2-(meth)acryloyloxyethoxy)phenyl]fluorene (log P=7.48), or p-phenylphenol (meth)acrylate (log P=3.98).

An example of the monofunctional radically polymerizable compound is a (meth)acrylamide derivative having a (meth)acrylamide group. When the (meth)acrylamide derivative is used, an adhesion layer excellent in adhesion property can be formed with high productivity. Specific examples of the (meth)acrylamide derivative include: an N-alkyl group-containing (meth)acrylamide derivative such as N-methyl(meth)acrylamide, N,N-dimethyl(meth)acrylamide, N,N-diethyl(meth)acrylamide, N-isopropyl(meth)acrylamide, N-butyl(meth)acrylamide, or N-hexyl(meth)acrylamide; an N-hydroxyalkyl group-containing (meth)acrylamide derivative such as N-methylol(meth)acrylamide, N-hydroxyethyl(meth)acrylamide, or N-methylol-N-propane(meth)acrylamide; an N-aminoalkyl group-containing (meth)acrylamide derivative such as aminomethyl(meth)acrylamide or aminoethyl(meth)acrylamide; an N-alkoxy group-containing (meth)acrylamide derivative such as H-methoxymethylacrylamide or N-ethoxymethylacrylamide; and an H-mercaptoalkyl group-containing (meth)acrylamide derivative such as mercaptomethyl(meth)acrylamide or mercaptoethyl(meth)acrylamide. In addition, as a heterocycle-containing (meth)acrylamide derivative in which the nitrogen atom of its (meth)acrylamide group forms a heterocycle, for example, there may be used N-acryloylmorpholine, N-acryloylpiperidine, N-methacryloylpiperidine, or N-acryloylpyrrolidine. Of those, an N-hydroxyalkyl group-containing (meth)acrylamide derivative is preferred, and H-hydroxyethyl(meth)acrylamide is more preferred.

In addition, as the monofunctional radically polymerizable compound, for example, there may be used a (meth)acrylic acid derivative having a (meth)acryloyloxy group; a carboxy group-containing monomer such as (meth)acrylic acid, carboxyethyl acrylate, carboxypentyl acrylate, itaconic acid, maleic acid, fumaric acid, crotonic acid, or isocrotonic acid; a lactam-based vinyl monomer such as N-vinylpyrrolidone, N-vinyl-ε-caprolactam, or methylvinylpyrrolidone; and a vinyl-based monomer having a nitrogen-containing heterocycle such as vinylpyridine, vinylpiperidone, vinylpyrimidine, vinylpiperazine, vinylpyrazine, vinylpyrrole, vinylimidazole, vinyloxazole, or vinylmorpholine.

When the polyfunctional radically polymerizable compound and the monofunctional radically polymerizable compound are used in combination, the content of the polyfunctional radically polymerizable compound is preferably from 20 wt % to 97 wt %, more preferably from 50 wt % to 95 wt %, still more preferably from 75 wt % to 92 wt %, particularly preferably from 80 wt % to 92 wt % with respect to the total amount of the radically polymerizable compounds. The content of the monofunctional radically polymerizable compound is preferably from 3 wt % to 80 wt %, more preferably from 5 wt % to 50 wt. %, still more preferably from 8 wt % to 25 wt %, particularly preferably from 8 wt. % to 20 wt % with respect to the total amount of the radically polymerizable compounds. When the contents fall within such ranges, a polarizing plate excellent in durability can be obtained.

The radical polymerization-curable adhesive may further contain any other additive. When the radical polymerization-curable adhesive contains a curable compound capable of being cured with an active energy ray, the adhesive may further contain, for example, a photopolymerization initiator, a photoacid generator, or a silane coupling agent. In addition, when the radical polymerization-curable adhesive contains a curable compound capable of being cured with heat, the adhesive may further contain, for example, a thermal polymerization initiator or a silane coupling agent. In addition, examples of the other additive include a polymerization inhibitor, a polymerization initiation aid, a leveling agent, a wettability improver, a surfactant, a plasticizer, a UV absorber, an inorganic filler, a pigment, and a dye.

(Cationic Polymerization-Curable Adhesive)

The cationic polymerization-curable adhesive contains a cationically polymerizable compound as the curable compound. An example of the cationically polymerizable compound is a compound having an epoxy group and/or an oxetanyl group. A compound having at least two epoxy groups in the molecule is preferably used as the compound having an epoxy group. Examples of the compound having an epoxy group include: a compound having at least two epoxy groups and at least one aromatic ring (aromatic epoxy compound); and a compound having at least two epoxy groups in the molecule, at least, one of which is formed between two adjacent constituent carbon atoms of an alicyclic ring (alicyclic epoxy compound).

The cationic polymerization-curable adhesive preferably contains a photocationic polymerization initiator. The photocationic polymerization initiator generates a cationic species or a Lewis acid through irradiation with an active energy ray such as visible light, UV light, an X-ray, or an electron beam, to thereby initiate a polymerization reaction of an epoxy group or an oxetanyl group. In addition, the cationic polymerization-curable adhesive may further contain the additive.

The adhesion layer is formed by, for example, applying the curable adhesive onto the polarizing film or the protective layer, subsequently bonding the protective layer or the polarizing film thereonto, and then curing the curable adhesive. It should be noted that, the protective layer may have an easy-adhesion layer formed thereon, or may be subjected to surface modification treatment, in advance. Examples of the surface modification treatment include corona treatment, plasma treatment, and saponification treatment.

Any appropriate method may be adopted as a method of applying the curable adhesive, depending on the viscosity of the adhesive and a desired thickness of the adhesion layer. An example of the application method is application with a reverse coater, a gravure coater (direct, reverse, or offset), a bar reverse coater, a roll coater, a die coater, a bar coater, a rod coater, or the like. In addition, application using a dipping method may be adopted.

Any appropriate method may be adopted as a method of curing the curable adhesive. When the curable adhesive contains a curable compound capable of being cured with an active energy ray, the adhesive may be cured by radiating the active energy ray from the polarizing film side or the protective layer side. From the viewpoint of preventing the deterioration of the polarizing film, it is preferred to radiate the active energy ray from the protective layer side. Conditions such as the wavelength and dose of the active energy ray may be set to any appropriate conditions depending on, for example, the kind of the curable compound to be used. When the curable adhesive contains a curable compound capable of being cured with heat, the adhesive may be cured through heating. Conditions for the heating may be set to any appropriate conditions depending on, for example, the kind of the curable compound to be used.

EXAMPLES

The present invention is specifically described by way of Examples. However, the present invention is not limited to Examples. It should be noted that measurement, methods for respective characteristics are as described below, and a protective layer, adhesives, and active energy ray used in Examples and Comparative Examples are as described below.

(Measurement Methods)

1. Thickness

A thickness was measured using a digital micrometer (manufactured by ANRITSU CORPORATION, trade name: "KC-351C").

2. Water Vapor Transmission Rate

Measurement was performed on the basis of the testing methods for determination of the water vapor transmission rate of moisture-proof packaging materials (dish method) described in JIS Z 0208.

3. Percentage of Bulk Water Absorption

A curable adhesive was cured under the same conditions as those of Example 1 to be described later to produce a cured product for evaluation having a thickness of 100 μm (weight: M1 g). The cured product for evaluation was immersed in pure water at 23° C. for 24 hours and was then taken out, and water on its surface was wiped off. After that, the weight (M2 g) of the cured product for evaluation after the immersion was measured. A percentage of bulk water absorption was calculated from the weight M1 g of the cured product for evaluation before the immersion and the weight M2 g of the cured product for evaluation after the immersion in accordance with the expression $\{(M2-M1)/M1\}\times 100(\%)$.

(Protective Layer)

Pellets of a methacrylic resin having a glutarimide ring unit were dried at 100.5 kPa and 100° C. for 12 hours, and were formed into a film shape by being extruded from a T-die at a die temperature of 270° C. through the use of a single-screw extruder. The film was stretched in its conveying direction CMD direction) under an atmosphere having a temperature higher than the Tg of the resin by 10° C., and was then stretched in a direction (TD direction) perpendicular to the conveying direction of the film under an atmosphere having a temperature higher than the Tg of the resin by 7° C. Thus, an acrylic film having a thickness of 40 μm and a water vapor transmission rate of 80 g/m$^2$ was obtained.

(Curable Adhesive)

Respective components were mixed as shown in Table 1A and Table 1B and stirred at 50° C. for 1 hour to obtain curable adhesives A and B and curable adhesives C to F each capable of being cured with an active energy ray. It should be noted that the curable adhesive A had a percentage of bulk water absorption of 1.3 wt %, and the curable adhesive B had a percentage of bulk water absorption of 63.2 wt %. In addition, the curable adhesive C had a percentage of bulk water absorption of 2.5 wt %, the curable adhesive D had a percentage of bulk water absorption of 3.1 wt %, the curable adhesive E had a percentage of bulk water absorption of 8.7 wt %, and the curable adhesive F had a percentage of bulk water absorption of 15.4 wt %.

TABLE 1A

| | | | Curable adhesive A | Curable adhesive B |
|---|---|---|---|---|
| Radically polymerizable compound | Monofunctional | HEAA | 10 parts by weight | 35 parts by weight |
| | | ACMO | — | 40 parts by weight |
| | | FA-THFM | 10 parts by weight | 0 parts by weight |
| | Polyfunctional | LIGHT ACRYLATE DCP-A | 80 parts by weight | 0 parts by weight |
| | | TPGDA | — | 25 parts by weight |
| Radical polymerization initiator | | IRGACURE 907 | 3 parts by weight | 3 parts by weight |
| | | KAYACURE DETX-S | 3 parts by weight | 3 parts by weight |

TABLE 1B

| | Curable adhesive | | C | D | E | F |
|---|---|---|---|---|---|---|
| Radically polymerizable compound | Monofunctional | HEAA | 10.0 | 15.0 | 15.0 | 25.0 |
| | | ACMO | 10.0 | 10.0 | 25.0 | 25.0 |
| | Polyfunctional | LIGHT ACRYLATE DCP-A | 80.0 | — | — | 50.0 |
| | | LIGHT ACRYLATE 1,9ND-A | — | 75.0 | 55.0 | — |
| | | ARONIX M-306 | — | — | 5.0 | — |
| Acrylic oligomer | | ARUFON UP-1190 | 20.0 | 15.0 | — | — |
| Alkoxy group-containing compound | | NIKALAC MX-750LM | — | 5.0 | — | — |
| Epoxy group-containing compound | | JER828 | — | — | 5.0 | — |
| Isocyanate compound | | Karenz AOI | 5.0 | — | — | — |
| Radical polymerization initiator | | IRGACURE 907 | 2.0 | 3.0 | 3.0 | 2.0 |
| | | KAYACURE DETX-S | 2.0 | 2.0 | 3.0 | 1.4 |
| Photoacid generator | | CPI-100P | — | 5.0 | 5.0 | — |

(parts by weight)

The radically polymerizable compounds in Table 1A and Table 1B are as follows:

HEAA: hydroxyethylacrylamide, log P=−0.56, Tg of its homopolymer=123° C., manufactured by KOHJIN Holdings Co., Ltd;

ACMO: acryloylmorpholine, log P=−0.20, Tg of its homopolymer=150° C., manufactured by KOHJIN Holdings Co., Ltd;

FA-THFM: tetrahydrofurfuryl (meth)acrylate, log P=1.13, Tg of its homopolymer=45° C., manufactured by Hitachi Chemical Co., Ltd;

LIGHT ACRYLATE DCP-A: tricyclodecanedimethanol diacrylate, log P=3.05, Tg of its homopolymer=134° C., manufactured by KYOEISHA CHEMICAL Co., LTD;

LIGHT ACRYLATE 1,9ND-A: 1,9-nonanediol diacrylate, log P=3.68, Tg of its homopolymer=68° C., manufactured by KYOEISHA CHEMICAL Co., LTD;

TPGDA: tripropylene glycol diacrylate, log P=1.68, Tg of its homopolymer=69° C., manufactured by TOAGOSEI CO., LTD. (ARONIX M-220); and ARONIX M-306: pentaerythritol tri/tetraacrylate, log P=1.04, Tg of its homopolymer=250° C. or more, manufactured by TOAGOSEI CO., LTD.

The acrylic oligomer refers to ARUFON UP-1190, log P=1.95, manufactured by TOAGOSEI CO., LTD., the alkoxy group-containing compound refers to NIKALAC MX-750LM, log P=0.8, manufactured by NIPPON CARBIDE INDUSTRIES CO., INC., the epoxy group-containing compound refers to JER828, log P=4.76, manufactured by Japan Epoxy Resin Co., Ltd., and the isocyanate compound refers to Karenz AOI, log P=1.6, manufactured by Showa Denko K.K.

The radical polymerization initiators are as follows:

IRGACURE 907 (2-methyl-1-(4-methylthiophenyl)-2-morpholinopropan-1-one), log P=2.09, manufactured by BASF; and KAYACURE DETX-S (diethylthioxanthone), log P=5.12, manufactured by Nippon Kayaku Co., Ltd.

The photoacid generator refers to CPI-100P (a propylene carbonate solution containing 50% of an active ingredient whose main component is triarylsulfonium hexafluorophosphate), manufactured by San-Apro Ltd.

(Active Energy Ray)

The active energy ray used was visible light (gallium-doped metal halide lamp, irradiation apparatus: "Light Hammer 10" manufactured by Fusion UV Systems, Inc., valve: V valve, peak illuminance: 1,600 mW/cm$^2$, cumulative dose: 1,000 mJ/cm$^2$ (wavelength: 330 to 440 nm)). It should be noted that the illuminance of the visible light was measured using Sola-Check System manufactured by Solatell Ltd.

Example 1

Polarizing Film

As a resin substrate, there was prepared an amorphous polyethylene terephthalate (IPA-copolymerized PET) film having a thickness of 100 μm, a Tg of 75° C., and 7 mol % of an isophthalic acid unit. A surface of the film was subjected to corona treatment (58 W/m$^2$/min).

PVA (average polymerization degree: 4,200, saponification degree: 99.2 mol %) having added thereto 1 wt % of acetoacetyl-modified PVA (manufactured by The Nippon Synthetic Chemical Industry Co., Ltd., trade name: GOHSEFIMER Z200, average polymerization degree: 1,200, saponification degree: 98.5 mol % or more, acetoacetylation degree: 5%) was prepared, and an aqueous solution containing 5.5 wt % of the PVA-based resin was prepared. The aqueous solution was applied onto the corona-treated surface of the resin substrate so as to have a film thickness after drying of 9 μm, and was dried with hot air under an atmosphere of 60° C. for 10 minutes to form a PVA-based resin layer having a thickness of 9 μm on the resin substrate. Thus, a laminate was produced.

The resultant laminate was first stretched in air at 130° C. at a ratio of 1.8 times (preliminary in-air stretching).

Next, the laminate was immersed in an aqueous solution of boric acid having a liquid temperature of 30° C. for 30 seconds to insolubilize the PVA-based resin layer. The aqueous solution of boric acid in this step was adjusted so as to have a boric acid content of 3 parts by weight with respect to 100 parts by weight of water.

Then, the laminate was dyed by being immersed in a dyeing liquid having a liquid temperature of 30° C. and containing iodine and potassium iodide for any appropriate period of time so that a polarizing films to be obtained had a single axis transmittance of from 40 to 44%. The dyeing liquid contained water as a solvent, and was adjusted so as to have an iodine concentration within the range of from 0.1 to 0.4 wt %, a potassium iodide concentration within the range of from 0.7 to 2.8 wt %, and a concentration ratio between iodine and potassium iodide of 1:7.

Next, the laminate was immersed in an aqueous solution of boric acid at 30° C. for 60 seconds to subject the PVA resin layer having adsorbed thereon iodine to cross-linking treatment. The aqueous solution of boric acid in this step was adjusted so as to have a boric acid content of 3 parts by weight with respect to 100 parts by weight of water, and a potassium iodide content of 3 parts by weight with respect to 100 parts by weight of water.

Further, the laminate was stretched in an aqueous solution of boric acid at a stretching temperature of 70° C. in the same direction as that in the previous preliminary in-air stretching at a ratio of 3.05 times (final stretching ratio: 5.50 times). The aqueous solution of boric acid in this step was adjusted so as to have a boric acid content of 4 parts by weight with respect to 100 parts by weight of water, and a potassium iodide content of 5 parts by weight, with respect to 100 parts by weight, of water.

Next, the laminate was washed with an aqueous solution adjusted so as to have a potassium iodide content of 4 parts by weight with respect, to 100 parts by weight of water, and was dried with hot air at 60° C. to obtain a polarizing film having a thickness of 3.7 μm on the resin substrate.

(Polarizing Plate)

The acrylic film having a thickness of 40 μm was bonded onto the obtained polarizing film (onto the surface on the side opposite to the resin substrate) through the intermediation of the curable adhesive A. Specifically, the curable adhesive was applied onto the acrylic film using an MCD coater (manufactured by FUJI KIKAI KOGYO Co., Ltd., cell shape: honeycomb, number of gravure roll lines: 1,000 lines/inch, rotational speed: 140%/relative to line speed) so as to have a thickness of 1.0 μm, and the whole was bonded using a rolling mill. The bonding was performed at a line speed of 25 m/min.

After that, the resultant was heated from the acrylic film side to 50° C. using an IR heater, and was irradiated with the visible light from the acrylic film side to cure the curable adhesive. Then, the resultant was dried with hot air at 70° C. for 3 minutes, and the PET film was peeled from the polarizing film to obtain a polarizing plate.

Example 2

A polarizing plate was produced in the same manner as in Example 1 except that in the production of the polarizing film, a PVA-based resin layer having a thickness of 11 μm was formed on the resin substrate to form a polarizing film having a thickness of 4.7 μm.

Example 3

A polarizing plate was produced in the same manner as in Example 1 except that in the production of the polarizing film, a PVA-based resin layer having a thickness of 17 μm was formed on the resin substrate to form a polarizing film having a thickness of 6.9 μm.

Example 4

A polarizing plate was produced in the same manner as in Example 1 except that in the production of the polarizing film, a PVA-based resin layer having a thickness of 22 μm was formed on the resin substrate to form a polarizing film having a thickness of 9.1 μm.

Example 5

A polarizing plate was produced in the same manner as in Example 2 except, that in the production of the polarizing plate, the thickness of the adhesion layer was changed to 0.8 μm.

Example 6

A polarizing plate was produced in the same manner as in Example 2 except that in the production of the polarizing plate, the thickness of the adhesion layer was changed to 1.5 μm.

Example 7

A polarizing plate was produced in the same manner as in Example 2 except that in the production of the polarizing plate, the curable adhesive C was used in place of the curable adhesive A.

Example 8

A polarizing plate was produced in the same manner as in Example 2 except that in the production of the polarizing plate, the curable adhesive D was used in place of the curable adhesive

Example 9

A polarizing plate was produced in the same manner as in Example 2 except that in the production of the polarizing plate, the curable adhesive E was used in place of the curable adhesive

Comparative Example 1

A polarizing plate was produced in the same manner as in Example 2 except that in the production of the polarizing plate, the thickness of the adhesion layer was changed to 0.5 μm.

Comparative Example 2

A polarizing plate was produced in the same manner as in Example 2 except, that in the production of the polarizing plate, the curable adhesive B was used in place of the curable adhesive A.

Comparative Example 3

A polarizing plate was produced in the same manner as in Example 2 except that in the production of the polarizing plate, the curable adhesive F was used in place of the curable adhesive A.

The polarizing film obtained in each of Examples and Comparative Examples was subjected to the following measurement.

(Optical Characteristics of Polarizing Film)

The single axis transmittance (Ts), parallel transmittance (Tp), and crossed transmittance (Tc) of the polarizing film were measured using an ultraviolet and visible spectrophotometer (V7100 manufactured by JASCO Corporation), and its polarization degree (P) was determined by the following equation. The transmittances are Y values measured with the two-degree field of view (C light source) of JIS Z 8701 and subjected to visibility correction. The measurement was performed under a state in which the protective layer (acrylic film) was bonded onto the polarizing film (state of a polarizing plate) so as to facilitate the handling of the polarizing film. The absorption of light by the protective layer is negligibly low as compared to the absorption of light by the polarizing film, and hence the transmittance of the polarizing plate was adopted as the transmittance of the polarizing film.

$$\text{Polarization degree }(P)=\{(Tp-Tc)/(Tp+Tc)\}^{1/2}\times 100$$

(Calculation of Absorbance)

The parallel transmittance Tp and crossed transmittance Tc measured in the transmittance and polarization degree measurement described above were used in the following equation to calculate a transmittance ka in the case where polarized light parallel to the absorption axis of the polarizing film was allowed to enter, and then the absorbance of the polarizing film in the absorption axis direction thereof (absorbance in the case where polarized light parallel to the absorption axis of the polarizing film is allowed to enter) Aa was calculated from ka. In the calculation, values at measurement wavelengths of from 380 to 780 nm were used as they were as Tp and Tc instead of the Y values subjected to visibility correction.

$$ka=(1/2)^{1/2}(Tp+Tc)^{1/2}/(Tp-Tc)^{1/2}$$

$$Aa=-\log_{10}(ka)$$

(Raman Spectrometry)

Figure 6:
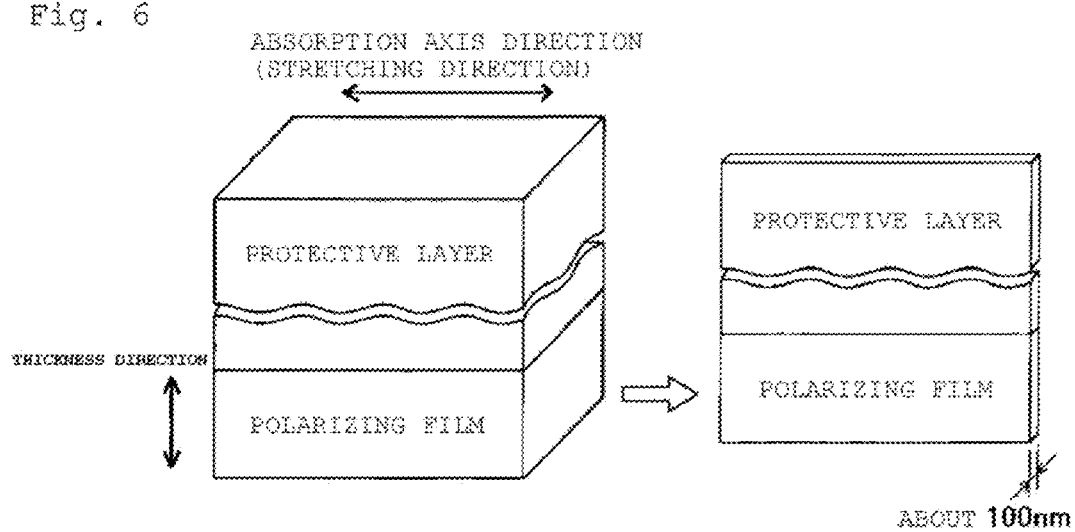
FIG. 6 is a diagram illustrating a method of producing a sample for Raman spectrometry.

As illustrated in FIG. 6, the central part of the obtained polarizing plate was cut in the absorption axis direction (stretching direction) of the polarizing film and in the thickness direction of the polarizing film using an ultramicrotome (manufactured by LEICA MICROSYSTEMS, product name: "LEICA ULTRACUT UCT" or "LEICA EM UC7"), to produce an ultrathin section sample measuring about 100 nm in a direction perpendicular to the absorption axis direction of the polarizing film and to the thickness direction of the polarizing film.

The apparatus and conditions used in Raman spectrometry are as described below.

Figure 7:
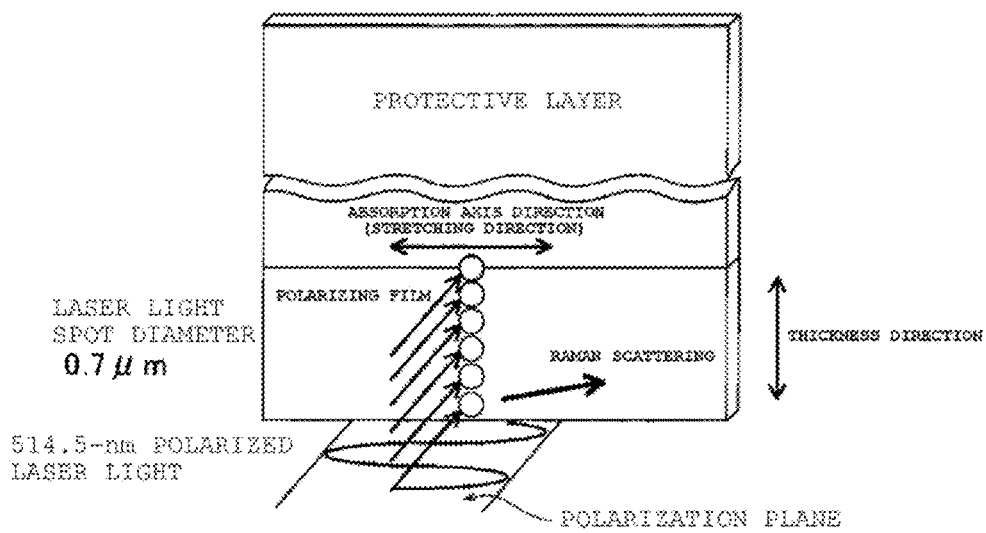
FIG. 7 is a diagram illustrating a Raman spectrometric method.

Apparatus: Laser Raman microscope, manufactured by Jobin Yvon S.A.S, LabRAM HR800 (manufactured by HORIBA Jobin Yvon SAS, HR800)
Excitation wavelength: 514.5 nm
Grating: 1,800 gr/mm
Objective lens: 100× (numerical aperture: 0.9)
Measurement pitch: 0.1 µm As illustrated in FIG. 7, the polarizing film cross-section of the ultrathin section sample was subjected to the measurement, of Raman spectra at measurement points at intervals of 0.1 µm in the thickness direction of the polarizing film.

Laser light was allowed to enter so that its polarization plane was parallel to the absorption axis direction (stretching direction) of the polarizing film and perpendicular to the polarizing film cross-section of the ultrathin section sample. In addition, an analyzer was placed behind the ultrathin section sample. The polarization plane of the analyzer was set parallel to the polarization plane of the laser light.

On the basis of the above-mentioned measurement conditions, the resolution, that is, the spot diameter (half-value width) of the laser light on the sample was 0.7 µm. When the center of the spot cross-section of the laser light was located at a position of 0.5 µm from the polarizing film surface, the spot cross-section of the laser light substantially corresponded to the center of a portion ranging from the polarizing film surface to a depth of 1 µm in the thickness direction of the polarizing film, and an error due to Raman scattering from $I_3^-$ that was present in a portion other than the portion ranging from the polarizing film surface to a depth of 1 µm in the thickness direction of the polarizing film or from air was small, which enabled satisfactory approximation of Is.

In each of the Raman spectra of Examples and Comparative Examples, as shown in FIG. 3, a peak corresponding to $I_3^-$ was observed around 108 $cm^{-1}$, and a peak corresponding to $I_5^-$ was observed around 158 $cm^{-1}$.

(Calculation of Integrated Intensity Distribution of $I_3^-$)

The Raman spectrum obtained at each measurement point was subjected to baseline correction to determine an integrated intensity in a wavenumber interval from 90 $cm^{-1}$ to 120 $cm^{-1}$.

The baseline correction was performed as follows: in the wave number interval from 90 $cm^{-1}$ to 120 $cm^{-1}$, a straight line connecting the respective points of a Raman intensity at a wavenumber of 90 $cm^{-1}$ and a Raman intensity at a wavenumber of 120 $cm^{-1}$ was used to approximate the baseline of the Raman spectrum as a straight line, and a distance from the approximation straight line was defined as a Raman intensity to correct the slope of the baseline at the time of the measurement (see FIG. 3). An integrated intensity distribution in the thickness direction of the polarizing film was determined from the resultant integrated intensities at the respective measurement points (FIG. 4). It should be noted that the origin of the thickness direction in the figure corresponds to the position of an inflection point to be described later, and it is assumed that light is allowed to enter from a negative coordinate side.

(Calculation of Value for Aa×(Is/Ia))

In FIG. 4, i.e., the graph of the integrated intensity distribution in the thickness direction of the polarizing film, a value Ia obtained by integrating the integrated intensity distribution in the entire interval in the thickness direction of the polarizing film was calculated. Specifically, an integrated intensity at a position x in the thickness direction before smoothing processing was represented by I(x), an integrated intensity $I_{WMA}(x)$ after smoothing processing was determined by the following equation, and $I_{WMA}(x)$ was integrated over the entire interval to calculate the value Ia.

$$I_{WMA}(x)=[I(x-0.5)\times1+I(x-0.4)\times2+I(x-0.3)\times4+I(x-0.2)\times6+I(x-0.1)\times8+I(x)\times10+I(x+0.1)\times8+I(x+0.2)\times6+I(x+0.3)\times4+I(x+0.4)\times2+I(x+0.5)\times1]/(1+2+4+6+8+10+8+6+4+2+1)$$

FIG. 4 shows an example of the resultant integrated intensity distribution after the smoothing processing.

Next, a value Is obtained by integrating the integrated intensity distribution of an integrated intensity in the thickness direction of the polarizing film in the entire interval in the thickness direction of the polarizing film, the integrated intensity being obtained by integrating the Raman scattering of $I_3^-$ that was present in the portion ranging from the polarizing film surface to a depth of 1 µm in the thickness direction of the polarizing film, and that was aligned in the absorption axis direction of the polarizing film in the wavenumber interval from 90 $cm^{-1}$ to 120 $cm^{-1}$, was approximately determined.

Specifically, first, in the integrated intensity distribution after the smoothing processing obtained as described above in the calculation of Ia, the position of an inflection point at a rise on the side on which light entered was identified by determining a local maximum value in the differential of the integrated intensity distribution.

Next, a value $I_{WMA}(0.5)$ for an integrated intensity after the smoothing processing at a position of +0.5 µm from the identified position of the inflection point was determined, and the value was adopted as Is.

On the basis of the thus-obtained values for Aa, Ia, and $I_{WMA}(0.5)$, a value for Aa×($I_{WMA}(0.5)$/Ia) was determined as a value for Aa×(Is/Ia) as described above.

(Evaluation)

The following evaluation was performed for each of Examples and Comparative Examples.

1. External Appearance Quality (Presence or Absence of Generation of Air Bubbles)

The polarizing plate of each of Examples and Comparative Examples was visually observed for its external appearance quality.

2. Durability (Presence or Absence of Generation of Speckles)

The polarizing plate of each of Examples and Comparative Examples was put into a heating and humidifying tester, and was then observed for the presence or absence of the generation of speckles, to thereby evaluate its durability. Details are as described below.

The polarizing film surface of the polarizing plate that had been cut into a size of 5 inches was bonded onto a glass plate through the intermediation of an acrylic pressure-sensitive adhesive (thickness: 20 µm) to produce an evaluation sample. The evaluation sample was stored in a heating and humidifying oven at a temperature of 65° C. and a humidity of 90% for 500 h, and was then taken out from the oven and stored overnight, followed by the observation of the presence or absence of the generation of speckles. The observation was performed by arranging the evaluation sample and a commercially available polarizing plate (manufactured by Nitto Denko Corporation, SEG-type polarizing plate) on a backlight having a brightness of 10,000 $cd/cm^2$ so that their absorption axes were perpendicular to each other.

TABLE 2A

| | Polarizing film | | | | Adhesive | | External appearance Generation of air bubbles | Durability Generation of speckles |
|---|---|---|---|---|---|---|---|---|
| | Transmittance (%) | Polarization degree (%) | Thickness (μm) | Aa × (Is/Ia) | Percentage of bulk water absorption (wt. %) | Thickness (μm) | | |
| Example 1 | 42.3 | 99.975 | 3.7 | 0.81 | 1.3 | 1.0 | Few | Absent |
| Example 2 | 42.1 | 99.990 | 4.7 | 0.70 | 1.3 | 1.0 | Few | Absent |
| Example 3 | 42.2 | 99.991 | 6.9 | 0.58 | 1.3 | 1.0 | Few | Absent |
| Example 4 | 40.1 | 99.988 | 9.1 | 1.09 | 1.3 | 1.0 | Few | Absent |
| Example 5 | 42.1 | 99.990 | 4.7 | 0.70 | 1.3 | 0.8 | Few | Absent |
| Example 6 | 42.1 | 99.990 | 4.7 | 0.70 | 1.3 | 1.5 | Few | Absent |
| Comparative Example 1 | 42.1 | 99.990 | 4.7 | 0.70 | 1.3 | 0.5 | Many | Absent |
| Comparative Example 2 | 42.1 | 99.990 | 4.7 | 0.70 | 68.2 | 1.0 | Few | Present |

TABLE 2B

| | Polarizing film | | | | Adhesive | | External appearance Generation of air bubbles | Durability Generation of speckles |
|---|---|---|---|---|---|---|---|---|
| | Transmittance (%) | Polarization degree (%) | Thickness (μm) | Aa × (Is/Ia) | Percentage of bulk water absorption (wt. %) | Thickness (μm) | | |
| Example 7 | 42.1 | 99.990 | 4.7 | 0.70 | 2.5 | 1.0 | Few | Absent |
| Example 8 | 42.1 | 99.990 | 4.7 | 0.70 | 3.1 | 1.0 | Few | Absent |
| Example 9 | 42.1 | 99.990 | 4.7 | 0.70 | 8.7 | 1.0 | Few | Absent |
| Comparative Example 3 | 42.1 | 99.990 | 4.7 | 0.70 | 15.4 | 1.0 | Few | Present |

Figure 8A:
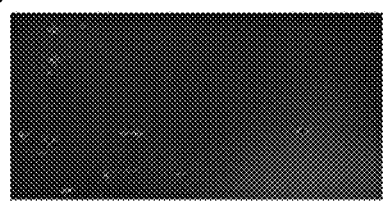
FIG. 8A is a photograph showing the evaluation result of durability of Comparative Example 2.
Figure 8B:
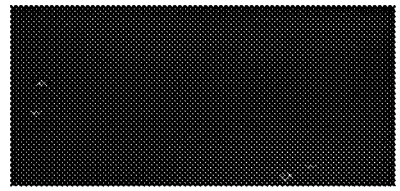
FIG. 8B is a photograph showing the evaluation result of durability of Example 2.

In each of Examples, no problem was found in both external appearance quality and durability. In Comparative Example 1, there was a problem in external appearance quality due to the generation of a large number of air bubbles. In Comparative Example 2 and Comparative Example 3, the durability was poor and streak-like speckles were generated after the heating and humidifying test as shown in FIG. 8A.

The polarizing plate of the present invention is suitably used for an image display apparatus. Specifically, the polarizing plate of the present invention is suitably used for liquid crystal panels of, for example, liquid crystal televisions, liquid crystal displays, mobile phones, digital cameras, video cameras, portable game machines, car navigation systems, copying machines, printers, facsimile machines, timepieces, and microwave ovens, and anti-reflection plates of organic EL devices.

What is claimed is:

1. A polarizing plate, comprising:
a polarizing film having a thickness of 10 μm or less; and
a protective layer provided on at least one side of the polarizing film through intermediation of an adhesion layer,
wherein the adhesion layer has a thickness of 0.7 μm or more,
wherein the adhesion layer has a percentage of bulk water absorption of 10 wt % or less, and
wherein the polarizing film has a value for Aa×(Is/Ia) of 0.53 or more, where:
the Aa represents an absorbance of the polarizing film in an absorption axis direction thereof at a wavelength of 480 nm;
the Ia represents a value obtained by integrating an integrated intensity distribution of an integrated intensity in a thickness direction of the polarizing film in an entire interval in the thickness direction of the polarizing film, the integrated intensity being obtained by integrating a Raman spectrum of the polarizing film in a wavenumber interval from 90 cm$^{-1}$ to 120 cm$^{-1}$; and
the Is represents a value obtained by integrating an integrated intensity distribution of an integrated intensity in the thickness direction of the polarizing film in the entire interval in the thickness direction of the polarizing film, the integrated intensity being obtained by integrating Raman scattering of $I_3^-$ that is present in a portion ranging from a polarizing film surface to a depth of 1 μm in the thickness direction of the polarizing film, and that is aligned in the absorption axis direction of the polarizing film in the wavenumber interval from 90 cm$^{-1}$ to 120 cm$^{-1}$.

2. The polarizing plate according to claim 1, wherein the thickness of the adhesion layer is 2 μm or less.

3. The polarizing plate according to claim 1, wherein the polarizing plate comprises the protective layer provided on only one side of the polarizing film through intermediation of the adhesion layer.

4. A method of producing the polarizing plate as claimed in claim 1, comprising in this order:
bonding the protective film onto the polarizing film obtained on a resin substrate through intermediation of the adhesion layer; and
peeling the resin substrate from the polarizing film.

5. An image display apparatus, comprising the polarizing plate according to claim 1.

* * * * *